United States Patent
Tomlinson

(10) Patent No.: US 11,093,535 B2
(45) Date of Patent: Aug. 17, 2021

(54) DATA PREPROCESSING USING RISK IDENTIFIER TAGS

(71) Applicant: Promontory Financial Group LLC, Washington, DC (US)

(72) Inventor: Joan W. Tomlinson, Alexandria, VA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 374 days.

(21) Appl. No.: 15/823,279

(22) Filed: Nov. 27, 2017

(65) Prior Publication Data
US 2019/0163813 A1  May 30, 2019

(51) Int. Cl.
| | |
|---|---|
| G06F 16/33 | (2019.01) |
| G06Q 10/06 | (2012.01) |
| G06F 40/117 | (2020.01) |
| G06F 40/205 | (2020.01) |
| G06F 40/284 | (2020.01) |

(52) U.S. Cl.
CPC ........ *G06F 16/3334* (2019.01); *G06F 40/117* (2020.01); *G06F 40/205* (2020.01); *G06F 40/284* (2020.01); *G06Q 10/0635* (2013.01)

(58) Field of Classification Search
CPC .. G06F 16/3334; G06F 40/284; G06F 40/205; G06F 40/117; G06Q 10/0635
See application file for complete search history.

(56) References Cited

U.S. PATENT DOCUMENTS

| | | | |
|---|---|---|---|
| 7,808,916 B1 * | 10/2010 | Futamura | H04L 63/1416 370/241 |
| 8,448,126 B2 | 5/2013 | Laight et al. | |
| 2005/0283751 A1 * | 12/2005 | Bassin | G06Q 10/04 717/100 |
| 2008/0319922 A1 * | 12/2008 | Lawrence | G06Q 20/04 705/36 R |
| 2009/0265200 A1 | 10/2009 | Boswell et al. | |
| 2011/0054961 A1 * | 3/2011 | DelZoppo | G06Q 10/0635 705/7.28 |
| 2014/0143134 A1 * | 5/2014 | Yan | G06Q 10/067 705/38 |
| 2016/0226905 A1 * | 8/2016 | Baikalov | H04L 63/1408 |
| 2016/0350885 A1 | 12/2016 | Clark | |

* cited by examiner

*Primary Examiner* — Jensen Hu
(74) *Attorney, Agent, or Firm* — Cuenot, Forsythe & Kim, LLC

(57) ABSTRACT

A method, system, and computer program product for preprocessing raw data based on risk identifier tags are presented. A first set of risk identifier tags based on risk assessment data is generated, in which the risk assessment data includes a set of indicators of operational risk of an entity. At least one risk identifier tag of the first set of risk identifier tags matches content of a data item within a raw dataset is determined. The at least one risk identifier tag is mapped to the data item. The mapped data item is provided to a risk assessment system to determine operational risk rating of the entity.

14 Claims, 5 Drawing Sheets

DATA PREPROCESSING USING RISK IDENTIFIER TAGS

TECHNICAL FIELD

The present invention relates generally to a method, system, and computer program product for data processing. More particularly, the present invention relates to a method, system, and computer program product for data preprocessing using risk identifier tags.

BACKGROUND

Real-world data is often incomplete, inconsistent, and/or lacking in certain behaviors or trends, and is likely to contain many errors. Data preprocessing provides a method to resolve such issues. Namely, data preprocessing prepares raw data for further processing. Data goes through a series of steps during preprocessing. The first step is data cleaning in which data is cleansed through processes such as filling in missing values, smoothing the noisy data, or resolving the inconsistencies in the data. The second step is data integration in which data with different representations are put together and conflicts within the data are resolved. The third step is data transformation in which data is normalized, aggregated and generalized. The fourth step is data reduction in which a reduced representation of the data in a data warehouse is performed. The final step is data discretization which involves the reduction of a number of values of a continuous attribute by dividing the range of attribute intervals.

Risk Management is the process of measuring or assessing risk and developing strategies to manage it. Strategies include transferring the risk to another party, avoiding the risk, reducing the negative effect of the risk, and accepting some or all of the consequences of a particular risk. Traditional risk management focuses on risks stemming from physical causes (e.g. natural disasters or fires, accidents, and death). Financial regulatory risk management, on the other hand, focuses on risks that can be managed using financial controls and legal and regulatory historical event data.

SUMMARY OF THE INVENTION

The illustrative embodiments provide a method, system, and computer program product. An aspect of the present invention generates a first set of risk identifier tags based on risk assessment data, the risk assessment data including a set of indicators of operational risk of an entity. The aspect of the present invention determines whether at least one risk identifier tag of the first set of risk identifier tags matches content of a data item within a raw dataset. If the at least one risk identifier tag matches the content of the data item, the aspect of the present invention maps the at least one risk identifier tag to the data item. The aspect of the present invention provides the mapped data item to a risk assessment system to determine operational risk rating of the entity.

An aspect of the present invention includes a computer program product. The computer program product includes one or more computer-readable storage devices, and program instructions stored on at least one of the one or more storage devices.

An aspect of the present invention includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION OF THE EMBODIMENTS

Figure 1:
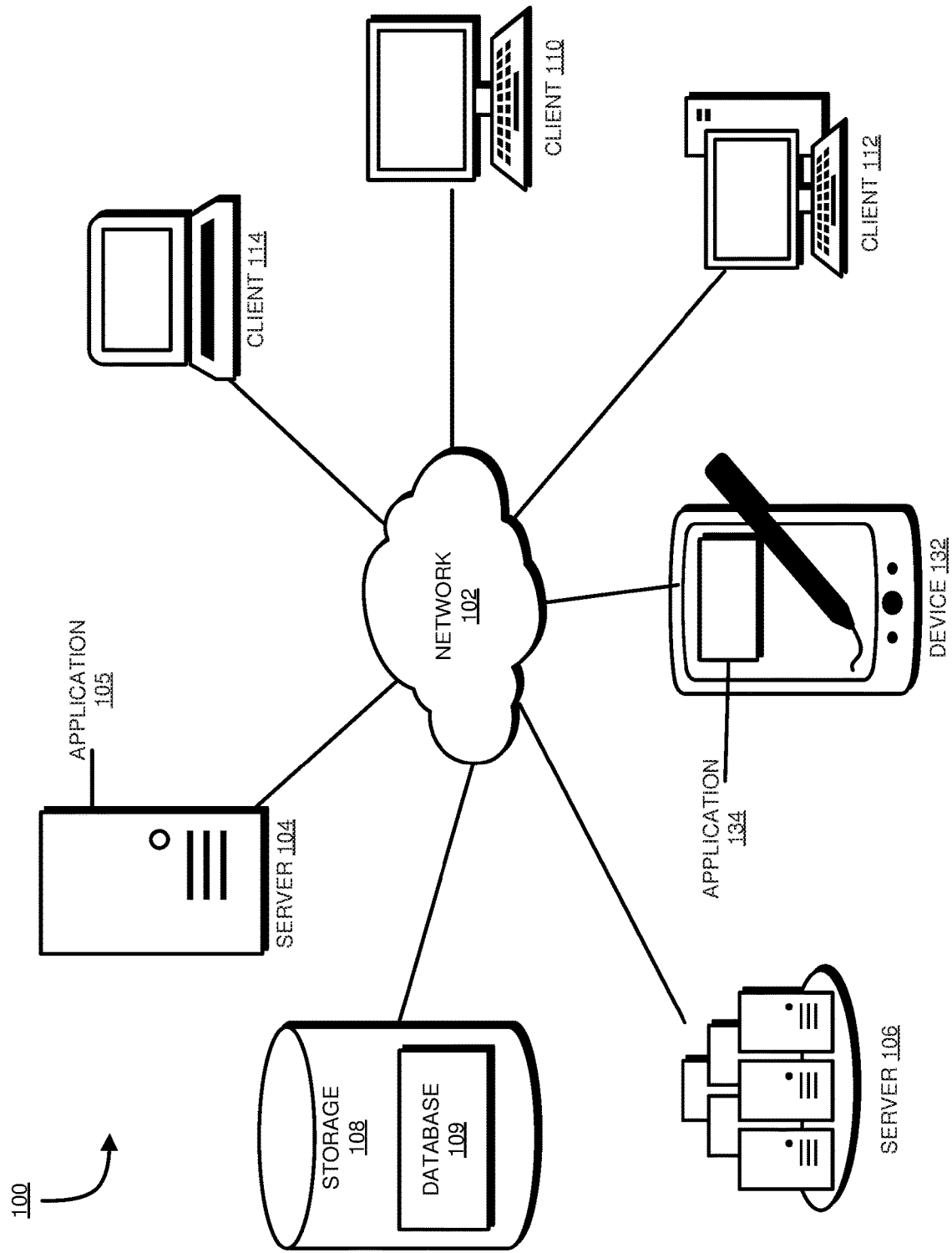
FIG. 1 depicts a block diagram of a network of data processing systems in which illustrative embodiments may be implemented.

Operational risk can include risks incurred by the internal activities, policies, procedures, and rules of an organization or an entity. Operational risk includes the risks arising from the people, systems, and processes through which a company operates. Operational risk can also include legal risk (including fines, penalties, punitive damages resulting from supervisory actions and private settlements) but excludes strategic and reputational risk. Operational risk events may be separated into seven categories: 1) internal fraud; 2) external fraud; 3) employment practices and workplace safety; 4) clients, products, and business practices; 5) damage to physical assets; 6) business disruption and system failures; and 7) execution, delivery & process management. Also, operational risk can include the risk of loss resulting from inadequate or failed internal processes, people, and systems. Illustrative embodiments recognize that banks and other financial institutions may assess their own operational risk in each category and calculate the capital reserve needed to cover any operational risk.

Illustrative embodiments also recognize that organizations and/or entities typically try to manage operational risk to keep losses within a specific amount that the organization is prepared to accept in pursuit of business or other objectives. While organizations accept that their people, processes, and systems are imperfect, and that losses will arise from errors and ineffective operations, organizations can also utilize technology, such as risk assessment software, to help identify, predict and reduce operational risk.

Further, illustrative embodiments recognize that regulations prescribe various standards for operational risk management for banks and similar financial institutions and give guidance as to how the organizations can develop internal systems to assess operational risk. For example, regulations allow some banks using the Advanced Measurement Approach (AMA) method of capital calculation for operational risk the flexibility to drop below the minimum requirements of capital-to-risk-weighted asset levels if they are able to meet certain requirements set forth by the Basel II regulation.

To facilitate review of the operational and all other types of risk, illustrative embodiments recognize that an organization may use a risk assessment software which may solicit risk information from a business unit about a process subject to a risk and communicate the risk information to a risk management system via a network. Illustrative embodiments recognize that the risk assessment software may determine a risk score associated with the process based on the risk information received from the business unit. The risk assessment software may communicate the risk score to a user that may be responsible for approving a risk management project associated with the process subject to the risk. After the approval has been granted, the risk assessment software may communicate information about an approved risk management project to a second user within the business unit, the risk management project including at least one control designed to mitigate a risk identified by the risk assessment system.

Illustrative embodiments recognize that a system to facilitate a risk assessment process may include a risk assessment software and a risk management system. The risk assessment software may include a computer device configured to assess a risk associated with a business process. The risk management software may be communicatively coupled to the risk assessment system such that the risk management system may be configured to manage a business project for mitigating the risk associated with the business process. In some cases, risk assessment software may provide a user interface having at least one user interface screen, a processor communicatively coupled to the user interface, and a memory device communicatively coupled to the user interface and the processor. The memory device may store instructions, when executed by the processor, cause the risk assessment software to solicit risk information from a business unit about a process subject to a risk via a first user interface screen and communicate the risk information to the risk assessment system via a network. The risk assessment system may determine a risk score associated with the process based on the risk information received from the business unit. In some cases, the risk assessment software may report the risk score to a user via a second user interface screen. The user, via a user interface screen of the risk assessment software, may provide approval of a risk management project for mitigating the risk associated with the process. The instructions may further cause the risk assessment software to communicate, after approval has been granted, information about the risk management project to the risk management system and to solicit, via a user interface screen, a risk management decision about an approved risk management project. The risk management decision may include a choice between closing the risk management project, accepting the risk associated with the project and applying at least one control to the risk management project. In some cases, the at least one control may be designed to mitigate a risk identified by the risk assessment system.

Illustrative embodiments recognize that risk assessment software may utilize data originating from several external sources to improve the accuracy of the determined risk. In such scenarios, illustrative embodiments recognize that risk assessment systems allow users to input data such as the number of high-risk customers, apply rules to such data, and calculate risk rating based on the applied rules. In other words, existing systems require a user to pre-process the data, perform calculations, and apply sets of rules to the pre-processed data. Although this approach may work for smaller datasets, the illustrative embodiments recognize that the process may be time-consuming and cost prohibitive as the datasets become larger.

Illustrative embodiments recognize that the collection of raw data sets from external sources are not well suited to function with protocols used to generate risk assessments. More often than not, the users need to format the datasets in a specific manner then analyze the datasets in conjunction with the protocols in order to apply the relevant rules to such formatted data. The illustrative embodiments recognize that users are simply not capable of parsing through large volumes of datasets and protocols, only to find that the subsequent step of applying rules can take even more time and effort to reach a meaningful risk assessment. Illustrative embodiments recognize that there is a significant technological problem with existing systems attempting to gain risk assessment insights based on raw data originating from external data sources.

Illustrative embodiments thus recognize that there is a need for systems to be able to load more raw data sets (e.g. a list of customers, volume of transactions occurring in a specific business category, list of products and services offered by an organization) and have them derive meaningful risk assessment insights, such as how many customers in the list are exposed high compliance risk based on the compliance rules and protocols. Illustrative embodiments recognize that this technological problem is not limited to assessing customer risk rating, but may also include various types of data including individual products or services offered by organizations.

The illustrative embodiments recognize that the presently available tools or solutions do not address the needs or provide adequate solutions for these needs. The illustrative embodiments used to describe the invention generally address and solve the above-described problems and other problems related to preprocessing of external datasets for risk assessment systems.

An embodiment can be implemented as a software application. The application implementing an embodiment can be configured as a modification of an existing software platform, as a separate application that operates in conjunction with an existing software platform, a standalone application, or some combinations thereof.

In one embodiment, the system leverages raw data to be applied to rules and then uses them for risk assessment which creates another dimension to the risk assessment systems as a result. In one embodiment, datasets from various external sources are received. The embodiment generates tags named risk indicators. In this embodiment, the risk indicators are created based on the protocols and regulations upon which risk assessments are determined. In some embodiments, the risk indicators can be generated by user input. In other embodiments, the risk indicators can be generated automatically by parsing the protocols and regulations and identifying the frequency of terms which could be assigned as risk indicator tags.

In one embodiment, each data item from the datasets is mapped to at least one risk indicator tag. In this embodiment, a risk indicator tag may be associated with several data items. Accordingly, the data items in the dataset may be formatted in a manner that these items are populated under each risk indicator tag. In another embodiment, a risk indicator tag may not exist for a particular data item. In such cases, a request may be provided to generate a second set of risk indicator tags that may match such particular data item. In some embodiments, if a risk indicator tag does not exist for a particular data item, the system generates a log to record the event and provide the log to a user for additional measures.

In one embodiment, the mapping of risk indicator tags to the data sets are used to identify values that can be determined by risk assessment system as high risk. The embodiment iterates through risk identifier tags to determine which tag may be determined as "high risk." For example, the embodiment may determine that presence of data items assigned with risk identifier tag named "offshore" should trigger "high risk" risk assessment. In this scenario, the embodiment may further determine that the dataset tagged with the risk identifiers should also be designated as "high risk."

In another embodiment, the system may iterate through the data set in each risk identifier tag to establish a threshold value and identify any data items that exceed the threshold value. In this embodiment, the data items that exceed that threshold value may be assigned as "high risk" data item for risk assessment of the organization. For example, the dataset pertains to a list of customers who spend X amount of dollars in cash transactions. Based on the risk identifier tag "recordation," data items exceeding Y threshold value of dollars spent in cash transactions can trigger "medium risk" in the risk assessment system and used for further processing.

In another embodiment, missing data and gaps are identified from the datasets that may impact the risk assessment. In this embodiment, a set of rules are constructed based on the prior ingest and processing of data, and the rules are applied generate a trend analysis to establish a baseline. Afterwards, the embodiment may receive a new processed dataset and applies the new dataset to the baseline. Once the embodiment recognizes gaps that may impact the risk assessment, the system alerts the user and provides appropriate recommendation measures.

The illustrative embodiments are described with respect to certain types of datasets, tags, mapping algorithms, rule generation algorithms, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
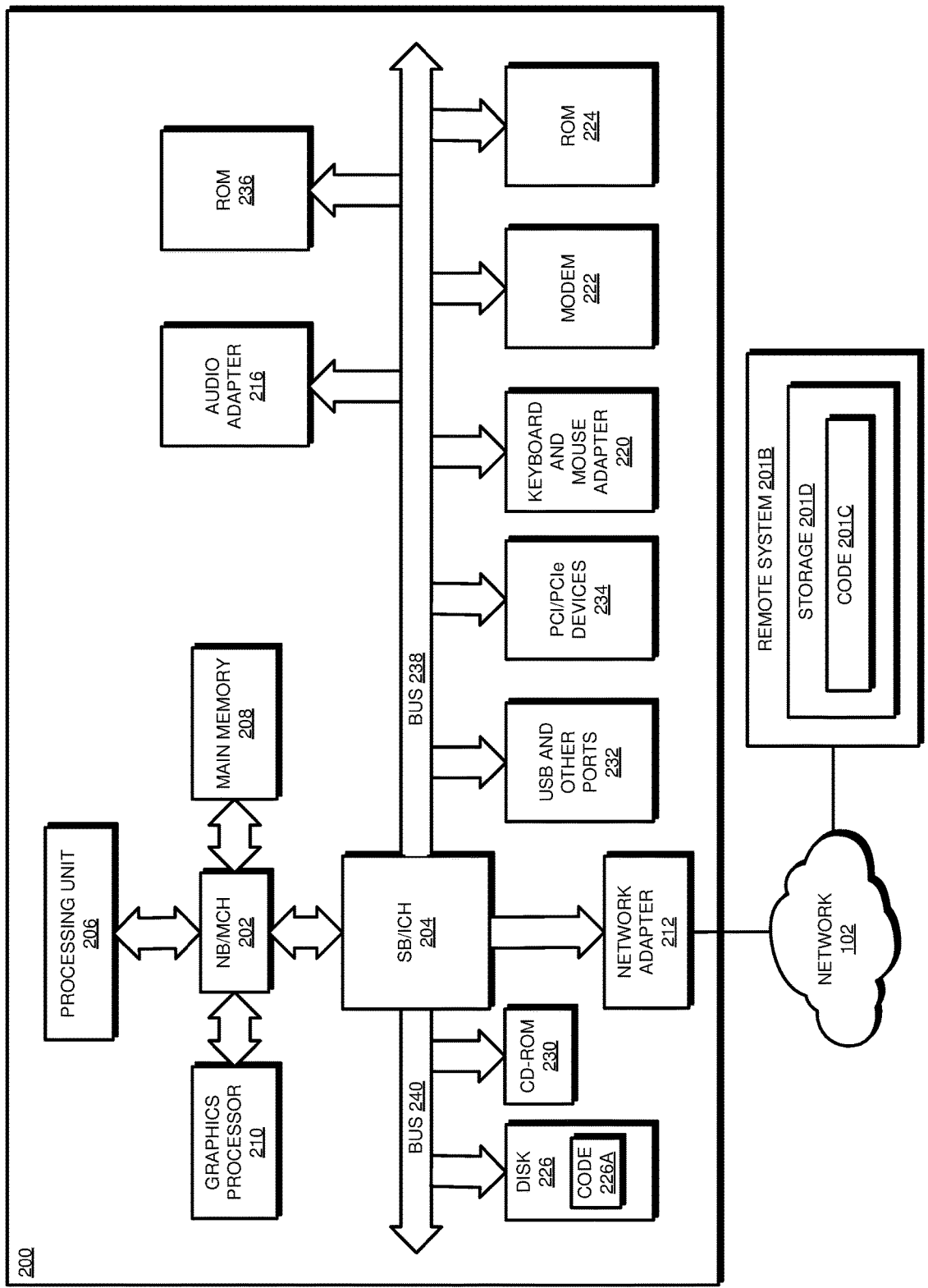
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 alone, application 134 alone, or applications 105 and 134 in combination implement an embodiment described herein. Channel data source 107 provides the past period data of the target channel or other channels in a manner described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 and/or application 134 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
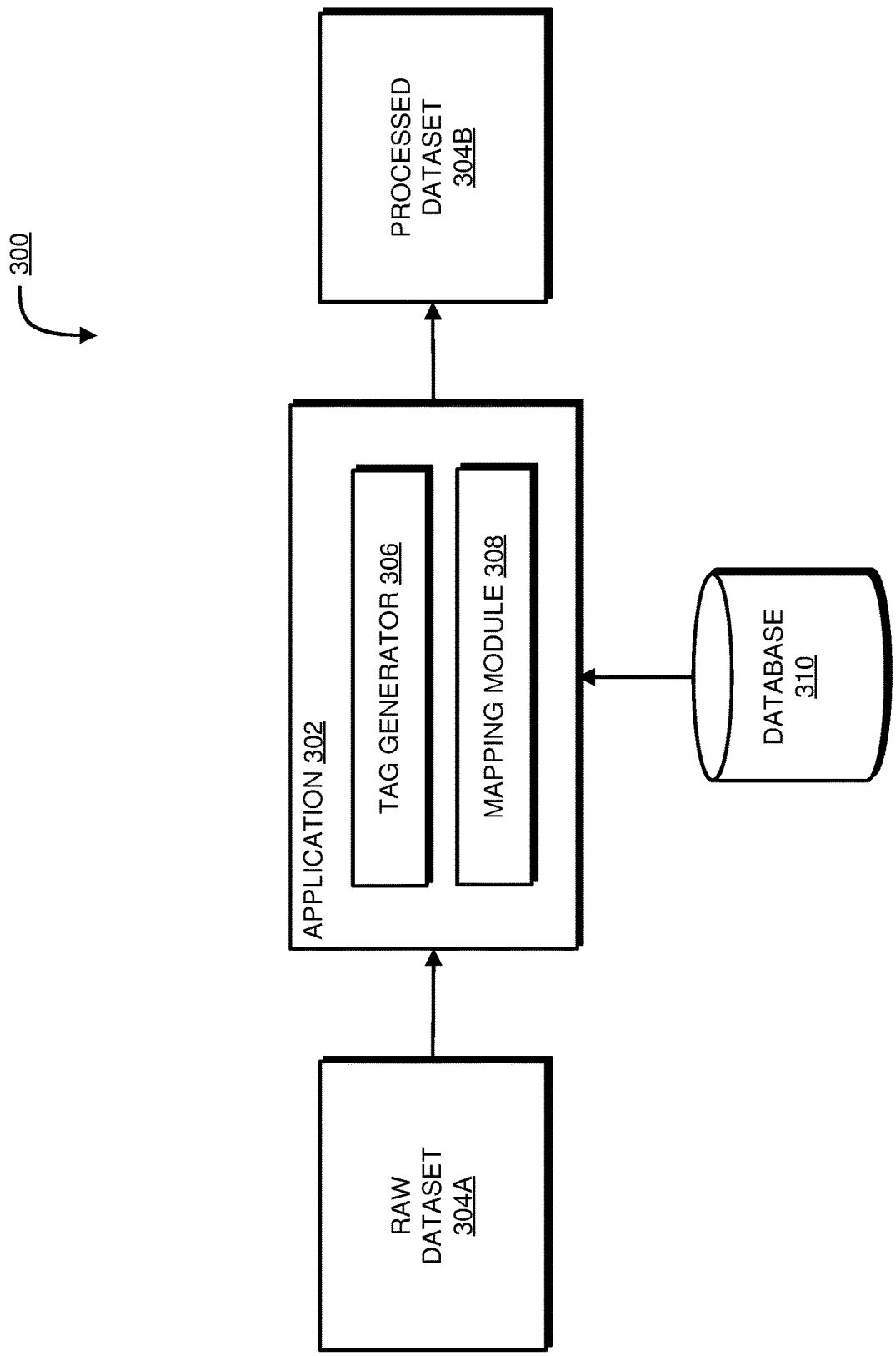
FIG. 3 depicts a block diagram of an example data preprocessing using risk identifier tags in accordance with an illustrative embodiment.

With reference to FIG. 3, this figure depicts a block diagram of an example data preprocessing using risk identifier tags in accordance with an illustrative embodiment. Application 302 is an example of application 105 in FIG. 1.

Raw dataset 304A, is a dataset (e.g., numbers, lists, figures, etc.) collected from external data sources. For example, consider a compiled list of customers of the organization and the volume of transactions conducted by each customer through the past two years. This dataset which is presented by a spreadsheet software without any further formatting or customization is considered as "raw data." In other words, raw dataset 304A has not been subjected to processing, "cleaning" to remove outliers, obvious instrument reading errors or data entry errors, or any analysis (e.g., determining central tendency aspects such as the average or median result). In addition, raw dataset 304A has not been subject to any other manipulation by a software program, analyst or technician. Examples of raw dataset 304A may include, but are not limited to, list of customers in the organization, list of products and services offered by the organization, categories of business activities conducted by the organization, and jurisdictions in which the organization conducts its business.

Raw dataset 304A includes a plurality of data items, each of which including data that indicates a degree of risk exposed to the organization. For example, if raw dataset 304A includes a list of customers of the organization and the volume of transactions conducted by each customer of the organization through the past two years, a single data item may include the identity of the customer and the corresponding volume of transactions conducted by such customer. In some embodiments, each of the plurality of data items includes at least two data categories, which could be presented in different formats, including columns in a spreadsheet, child (e.g. subtree, branch nodes) tags in an XML or JSON file.

In one embodiment, application 302 includes tag generator 306 and mapping module 308. Tag generator 306 generates a set of risk identifier tags based on protocols and risk assessments provided by database 310. In some embodiments, the protocols and risk assessments may be structured data from which the risk identifier tags are generated. For example, protocols may include, but are not limited to, a plurality of data columns such as name of the protocol, the source from which the protocol was generated, the date when the protocol was added to the database, the business category which the protocol relates, the set of actions required to satisfy the protocol, a designated risk identifier tag, and the risk associated with non-compliance of such protocol. Tag generator 306 iterates through the data fields of the structured data and determines the most relevant column, in this example, the designated risk identifier tag column. Tag generator 306 then extracts the data in the column and designates the risk identifier tag with the extracted data.

In other embodiments, the protocols and risk assessments may be unstructured data, e.g. text document, in which tag generator 306 parses for the relevant data to generate the set of risk identifier tags. In one embodiment, tag generator 306 receives a set of protocol or risk assessment text documents, identifies the most frequently occurring keyword, and assigns the keyword as a risk identifier tag. For example, tag generator 306 parses through a set of protocol documents and removes any keywords from consideration such as "a", "the", "for", and "to" based on a dictionary database which provides such to-be-ignored keyword list. Then, tag generator 306 identifies the three most frequently appearing keywords, which include "customer identification", "diligence for brokers", and "governance and management oversight". In this example, tag generator 306 assigned the three keywords as a set of risk indicator tags. In some embodiments, tag generator 306 may determine a set of rules that provide how many risk identifier tags are to be generated, such as selecting the top five most frequently occurring keywords from the set of protocol and risk assessment documents.

In other embodiments, tag generator 306 determines the risk identifier tags based on unstructured data by executing a tag generation algorithm such as pointwise mutual information (PMI) algorithm. In this embodiment, tag generator 306 identifies a first keyword and assigns a (PMI) score based on the frequency of the first keyword appearing in a first protocol or risk assessment document which does not otherwise appear in other documents. Tag generator 306 iterates through all protocol or risk assessment documents to identify the remaining keywords and assign the PMI scores as provided above. After the iteration is complete, tag generator 306 ranks the identified keywords based on the assigned PMI scores and generates a set of risk identifier tags based on the ranked keywords.

Mapping module 308 assigns at least one risk identifier tag generated by tag generator 306 to each data item within raw dataset 304A. In one embodiment, mapping module 308 assigns the risk identifier tag to a data item in raw dataset 304A if the content in the data item matches the risk identifier tag based on a degree of similarity. In some embodiments, if mapping module 308 determines that none of the risk identifier tags matches a data item in raw dataset 304A (e.g., the degree of similarity does not exceed a predetermined threshold value), then mapping module 308 may request for a second set of risk identifier tags to tag generator 306. In this embodiment, tag generator 306 may identify the second set of risk identifier tags by adjusting the rules on how the tags are to be generated, including expanding to a larger section of the keywords that were ranked based on the PMI scores.

In another embodiment, mapping module 308 assigns at least one risk identifier tag to a data item within raw dataset 304A based on numerical values included in data item exceeding a threshold value. For example, consider a data item from raw dataset 304A pertaining to a list of customers who spend a certain amount of cash transactions. If a data item reveals that customer A spends a large amount of cash transactions exceeding a threshold value, mapping module 308 may assign a risk identifier tag indicative of "recordation requirements." In other embodiments, mapping module 308 may assign a risk identifier tag based on a data item missing certain types of data as required by the protocols and risk assessments. In several embodiments, mapping module 308 iterates through all data items in raw dataset 304A and assigns at least one risk identifier tag.

Processed dataset 304B is a dataset in which its data items are assigned with at least one identifier tag by the embodiments as provided above. Processed dataset 304B can be used by risk assessment systems to identify which data items should trigger a risk rating, the degree of which indicating the risk exposed to the organization. For instance, the data items tagged with "compliance risk" based on missing data may trigger a "high risk" rating, which the risk assessment system provides a series of subsequent actions to be performed to remediate any issues that may occur with the "high risk" rating. In some embodiments, all data items with a first risk identifier tag may trigger a certain risk rating. In other embodiments, a subset of data items within the risk identifier tag may trigger the risk rating.

Figure 4:
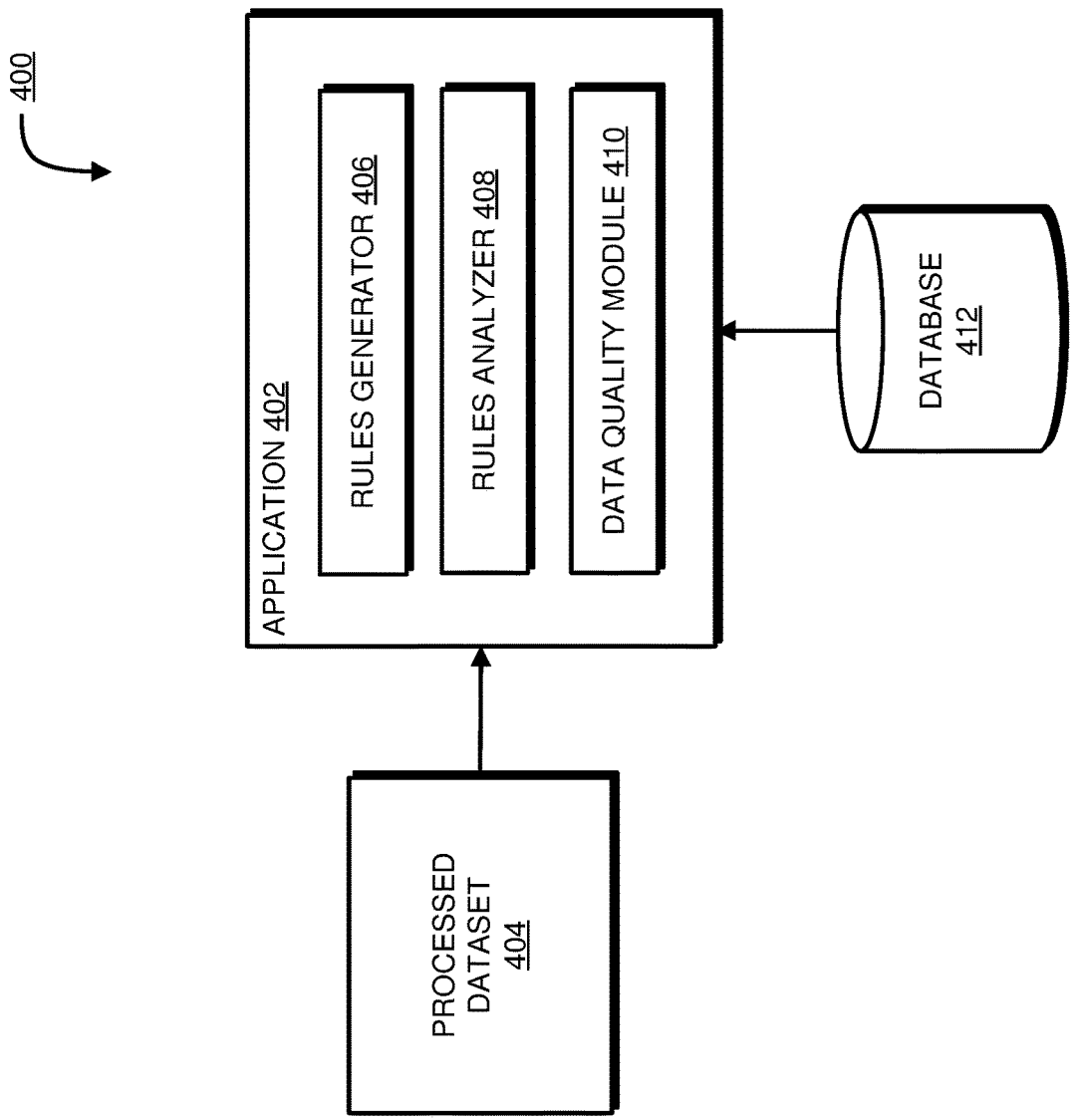
FIG. 4 depicts a block diagram of an example rule generation for data preprocessing in accordance with an illustrative embodiment.

With reference to FIG. 4, this figure depicts a block diagram of an example rule generation for data preprocessing in accordance with an illustrative embodiment. Application 402 is an example of application 105 in FIG. 1 and application 302 in FIG. 3. Processed dataset 404 is an example of processed dataset 304B in FIG. 3.

Application 402 includes rules generator 406, rules analyzer 408, and data quality module 410. In one embodiment, rules generator 406 may access database 412 to retrieve a plurality of historical datasets to generate a set of rules in which processed dataset 404 will be applied. In some embodiments, rules generator 406 generates a set of candidate rules based on the associative relationships of data within each data item in the historical datasets. Based on the candidate rules, rule generator 406 determines whether each candidate rule exceeds a predetermined minimum support value, which determines how often a candidate rule is applicable to a historical dataset, and a predetermined minimum confidence value, which determines how often associative relationships as represented in a candidate rule appears on the historical dataset. If a candidate rule exceeds both minimum support and confidence thresholds, rules generator 406 stores the candidate rule to be applied by rules analyzer 408. If a candidate rule does not exceed either minimum support or confidence thresholds, rules generator 406 discards the candidate rule.

Rules analyzer 408 receives the rules generated and stored by rules generator 406 and establishes a baseline of the historical data items based on the stored rules. In one embodiment, rules analyzer 408 retrieves a subset of historical data items based on executing a query on the stored rule and performs a trend analysis on the subset such as utilizing a linear regression algorithm or a Holt-Winters method algorithm. Once the trend analysis is complete, rules analyzer 408 determines a baseline value against which processed dataset 404 will be compared. In some embodiments, the baseline value is an average value derived from the subset of historical data. In other embodiments, the baseline value is a media value derived from the subset of historical data.

Data quality module 410 receives processed dataset 404 and compares processed dataset 404 to the baseline value as determined by rules analyzer 408. If processed dataset 404 exceeds the baseline value, data quality module 410 does not take any additional action and provides processed dataset 404 to risk assessment systems to calculate risk ratings based on the data items tagged with risk identifier tags. If processed dataset 404 does not exceed the baseline value, data quality module 410 alerts the risk assessment system that the overall quality of processed data 404 may be incomplete. In one embodiment, data quality module 410 determines that processed data 404 may have missing data items which do not allow risk assessment systems to calculate an accurate risk rating. In other embodiments, data quality module 410 determines that processed data 404 may have too many data items that deviate from the values as provided in the historical datasets. Once these issues are tagged, data quality module 410 may recommend a series of actions for a user to address the issues present in the processed data 404. For example, data quality module 410 may recommend a user to include additional raw datasets in the same subject domain as the processed data 404. In another embodiment, data quality module 410 may allow the user to override the alert issued to the risk assessment system.

Figure 5:
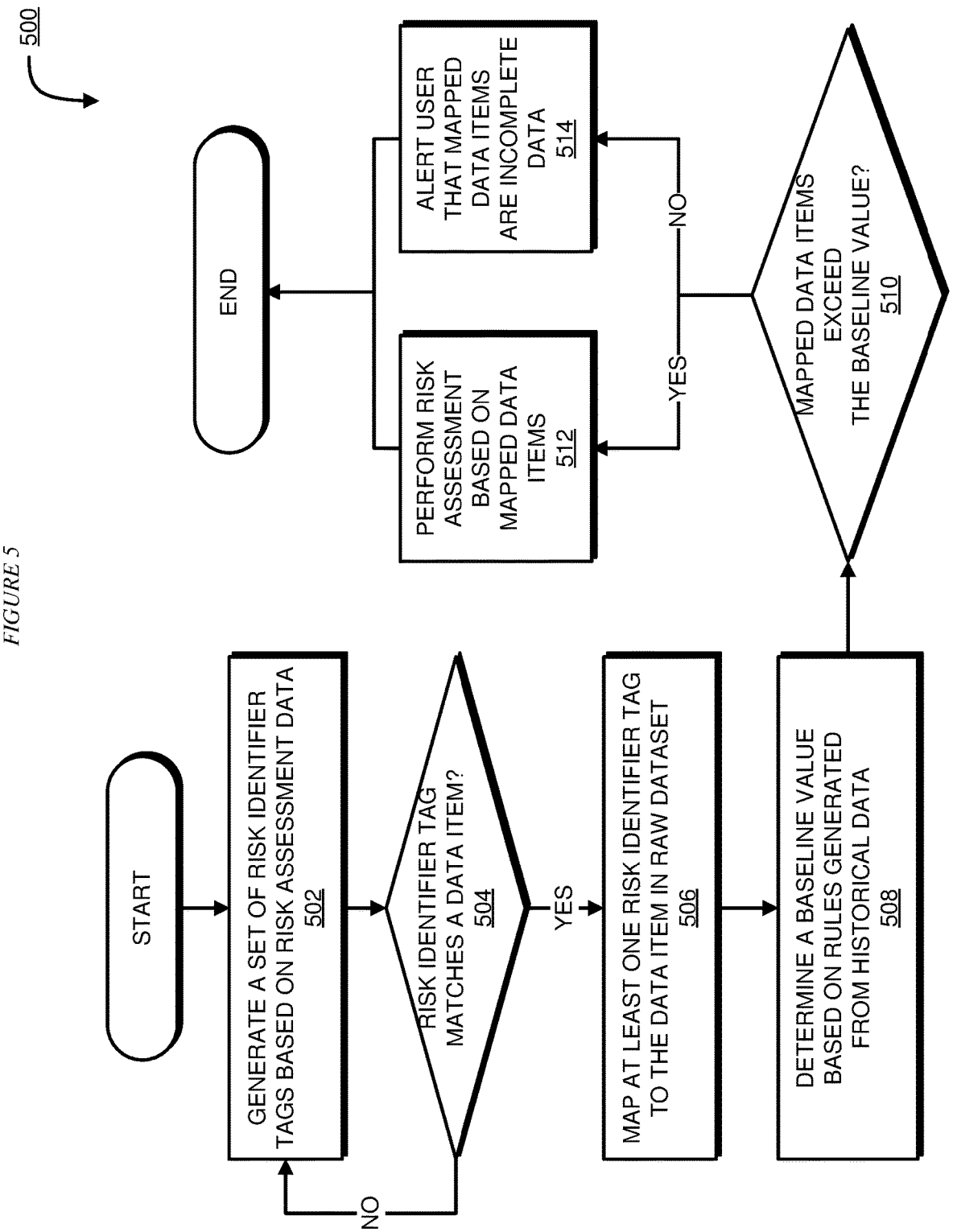
FIG. 5 depicts a flowchart of an example process for data preprocessing using risk identifier tags in accordance with an illustrative embodiment.

With reference to FIG. 5, this figure depicts a flowchart of an example process for data preprocessing using risk identifier tags in accordance with an illustrative embodiment. Process 500 may be implemented in application 302 in FIG. 3.

The application generates a set of risk identifier tags based on risk assessment data (block 502). The application determines whether at least one risk identifier tag matches a data item from a raw dataset (block 504). If not ("no" path of block 504), the application generates a second set of risk identifier tags based on risk assessment data. If the application determines that at least one risk identifier tag matches a data item from a raw dataset ("yes" path of block 504), the application maps at least one risk identifier to the data item in the raw dataset (block 506).

The application determines a baseline value based on a set of rules generated from historical data (block 508). In one embodiment, the historical data may be protocol or risk assessment documents previously generated and stored in a database, e.g. database 412 in FIG. 4. The application determines whether the mapped data items exceed the baseline value (block 510). If so ("yes" path of block 510), the application performs a risk assessment based on the mapped data items (block 512). In one embodiment, the application recalculates an existing risk assessment rating based on the mapped data items.

If the application determines that the mapped data items do not exceed the baseline value ("no" path of block 510), the application alerts to the user that the mapped data items are incomplete data (block 514). In some embodiments, the process ends after issuing the alert. In other embodiments, the application returns to block 512 and performs risk assessment, although the risk assessment system may notify the user that the risk assessment may include a gap or missing data items, i.e. incomplete data. Process 500 terminates thereafter.

Thus, a computer implemented method, system or apparatus, and computer program product are provided in the illustrative embodiments for merging two documents that may contain different perspectives and/or bias. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implement data method of preprocessing raw data contained in a raw computer dataset based on risk identifier tags performed by a computer application executing within a computer hardware system, the method comprising:
generating, by a tag generator executing within the computer application, a first computer dataset of risk identifier tags based on risk assessment computer data that includes a set of indicators of operational risk of an entity;
performing a data comparison operation, by a mapping module of the computer application, to determine whether at least one risk identifier tag of the first computer dataset of risk identifier tags matches content of a data item within the raw computer dataset;
generating, by the mapping module and based upon the at least one risk identifier tag matching the content of the data item, a processed computer dataset in which the at least one risk identifier tag is assigned to the data item; and
providing the processed computer data set to a risk assessment system to determine operational risk rating of the entity, wherein
the operational risk of the entity includes risks incurred by internal activities of the entity,
the raw computer dataset is collected from external data sources and the raw data contained within the raw computer dataset has not been subject to processing,
the risk assessment computer data is unstructured data;
a plurality of keywords are extracted based on parsing the unstructured data;
a subset of extracted keywords are designated as the first computer dataset of risk identifier tags based upon the subset of keywords exceeding a minimum threshold value; and
a second computer dataset of risk identifier tags are generated by adjusting the minimum threshold value used to designate the first computer dataset of risk identifier tags based upon no risk identifier tag in the first computer dataset of risk identifier tags matches the content of the data item.

2. The method according to claim 1, wherein
each of the extracted plurality of keywords are assigned with a score value based on applying a pointwise mutual information algorithm; and
the extracted plurality of keywords are ranked based on the assigned score value.

3. The method according to claim 1, wherein
a set of rules are generated based on historical data; and
a baseline value is determined based on the generated set of rules.

4. The method according to claim 3, wherein
a determination is made whether a mapped data item in the processed computer data set exceeds the baseline value; and
an alert that the mapped data item is incomplete data and an accurate risk assessment cannot be conducted is issued upon the determination being negative.

5. The method according to claim 3, wherein
the baseline value is determined based upon
filtering the historical data based on the generated set of rules; and
performing a trend analysis on the filtered historical data.

6. A computer program product, comprising:
one or more computer readable storage medium having stored thereon program instructions for preprocessing raw data contained in a raw computer dataset based on risk identifier tags,
the program instructions, which when executed by a computer application executing within a computer hardware system, causes the computer hardware system to perform:
generating, by a tag generator executing within the computer application, a first computer dataset of risk identifier tags based on risk assessment computer data that includes a set of indicators of operational risk of an entity;
performing a data comparison operation, by a mapping module of the computer application, to determine whether at least one risk identifier tag of the first computer dataset of risk identifier tags matches content of a data item within the raw computer dataset;
generating, by the mapping module and based upon if the at least one risk identifier tag matching the content of the data item, a processed computer dataset in which the at least one risk identifier tag is assigned to the data item; and
providing the processed computer data set to a risk assessment system to determine operational risk rating of the entity, wherein
the operational risk of the entity includes risks incurred by internal activities of the entity,
the raw computer dataset is collected from external data sources and the raw data contained within the raw computer dataset has not been subject to processing,
the risk assessment computer data is unstructured data;
a plurality of keywords are extracted based on parsing the unstructured data;
a subset of extracted keywords are designated as the first computer dataset of risk identifier tags based upon the subset of keywords exceeding a minimum threshold value; and
a second computer dataset of risk identifier tags are generated by adjusting the minimum threshold value used to designate the first computer dataset of risk identifier tags based upon no risk identifier tag in the first computer dataset of risk identifier tags matches the content of the data item.

7. The computer program product of claim 6, wherein
each of the extracted plurality of keywords are assigned with a score value based on applying a pointwise mutual information algorithm; and
the extracted plurality of keywords are ranked based on the assigned score value.

8. The computer program product of claim 6, wherein
a set of rules are generated based on historical data; and
a baseline value is determined based on the generated set of rules.

9. The computer program product of claim 8, wherein
a determination is made whether a mapped data item in the processed computer data set exceeds the baseline value; and
an alert that the mapped data item is incomplete data and an accurate risk assessment cannot be conducted is issued upon the determination being negative.

10. The computer program product of claim 8, wherein
the baseline value is determined based upon
filtering the historical data based on the generated set of rules; and
performing a trend analysis on the filtered historical data.

11. A computer hardware system for preprocessing raw data contained in a raw computer dataset based on risk identifier tags, comprising:
a hardware processor including a computer application configured to perform:
generating, by a tag generator executing within the computer application, a first computer dataset of risk identifier tags based on risk assessment computer data that includes a set of indicators of operational risk of an entity;
performing a data comparison operation, by a mapping module of the computer application, to determine whether at least one risk identifier tag of the first computer dataset of risk identifier tags matches content of a data item within the raw computer dataset;
generating, by the mapping module and based upon if the at least one risk identifier tag matching the content of the data item, a processed computer dataset in which the at least one risk identifier tag is assigned to the data item; and
providing the processed computer data set to a risk assessment system to determine operational risk rating of the entity, wherein
the operational risk of the entity includes risks incurred by internal activities of the entity,
the raw computer dataset is collected from external data sources and the raw data contained within the raw computer dataset has not been subject to processing,
the risk assessment computer data is unstructured data;
a plurality of keywords are extracted based on parsing the unstructured data;
a subset of extracted keywords are designated as the first computer dataset of risk identifier tags based upon the subset of keywords exceeding a minimum threshold value; and
a second computer dataset of risk identifier tags are generated by adjusting the minimum threshold value used to designate the first computer dataset of risk identifier tags based upon no risk identifier tag in the first computer dataset of risk identifier tags matches the content of the data item.

12. The system of claim 11, wherein
each of the extracted plurality of keywords are assigned with a score value based on applying a pointwise mutual information algorithm; and
the extracted plurality of keywords are ranked based on the assigned score value.

13. The system of claim 11, wherein
a set of rules are generated based on historical data; and
a baseline value is determined based on the generated set of rules.

14. The system of claim 13, wherein
a determination is made whether a mapped data item in the processed computer data set exceeds the baseline value; and
an alert that the mapped data item is incomplete data and an accurate risk assessment cannot be conducted is issued upon the determination being negative.

* * * * *